United States Patent [19]
Liertz et al.

[11] 4,257,707
[45] Mar. 24, 1981

[54] DEVICE FOR MEASURING THE ATTENUATION OF OPTICAL WAVES ON OPTICAL TRANSMISSION PATHS

[75] Inventors: Heinrich Liertz; Ulrich Oestreich, both of Munich; Guenter Zeidler, Unterpfaffenhofen, all of Fed. Rep. of Germany

[73] Assignee: Siemens Aktiengesellschaft, Berlin & Munich, Fed. Rep. of Germany

[21] Appl. No.: 962,718

[22] Filed: Nov. 21, 1978

[30] Foreign Application Priority Data

Nov. 25, 1977 [DE] Fed. Rep. of Germany ....... 2752688

[51] Int. Cl.³ .......................................... G01N 21/84
[52] U.S. Cl. .................................... 356/73.1; 356/407
[58] Field of Search .................... 356/73.1, 237, 407

[56] References Cited
U.S. PATENT DOCUMENTS 3,910,701 10/1975 Henderson et al. ................... 356/39

OTHER PUBLICATIONS

Meinke-Gundlach: Taschenbuch der Hochfrequenztechnik, Berlin, Göttingen, Heidelberg, 1962, pp. 312-322.
Elektrisches Nachrichtenwesen, Bd. 51, No. 4, 1976, pp. 261-268.
Electronics & Communication in Japan, vol. J59-C, No. 2, 1976, pp. 122-130.
Feingeratetechnik, vol. 21, No. 4, 1972, pp. 151-155.
"Optical-Fiber Impulse-Response Measuring System", IEEE Transactions on Instrumentation & Measurement, vol. IM25, #4, pp. 401-406, Dec. 1976, Dannwolf et al.
"Fibers Simple Testing Methods Give Users a Feel for Cable Parameters", Chesler et al., Electronics, Aug. 5, 1976, pp. 90-129.

Primary Examiner—Vincent P. McGraw
Attorney, Agent, or Firm—Hill, Van Santen, Steadman, Chiara & Simpson

[57] ABSTRACT

In order to be able to measure the attenuation of a lightwave guide fiber definitely and reproducibly, it is suggested to offer a mode distribution to the lightwave guide to be measured which corresponds with the "steady state" of a very long fiber. A mode mixer and a mode stripper is for this purpose connected in series with the lightwave guide to be measured. All core modes and leakage- and jacket modes are excited in the mode mixer. In the mode stripper the jacket- and leakage modes are again stripped (absorbed) so that a mode distribution, comparable to the "steady state", remains.

8 Claims, 1 Drawing Figure

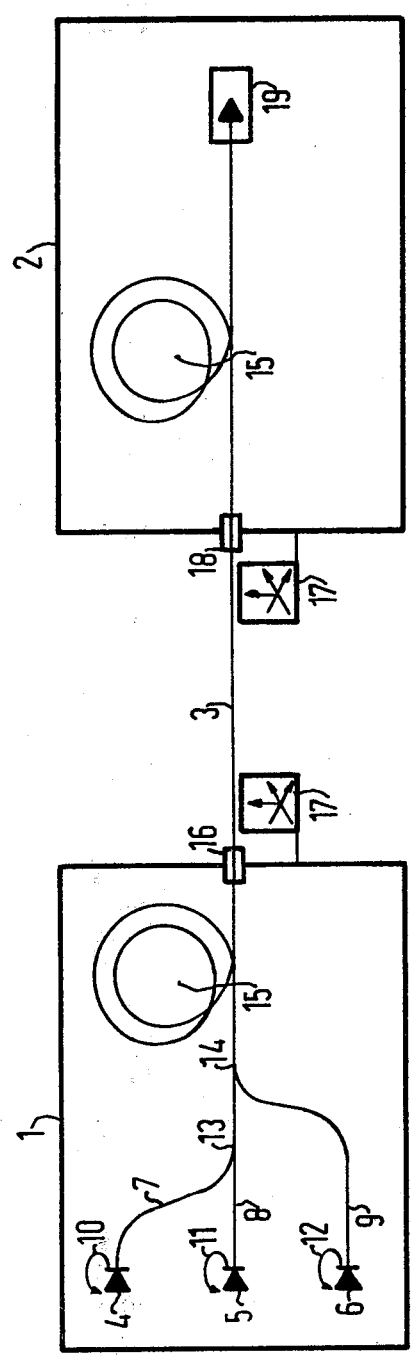

DEVICE FOR MEASURING THE ATTENUATION OF OPTICAL WAVES ON OPTICAL TRANSMISSION PATHS

BACKGROUND OF THE INVENTION

The invention relates to a device for measuring the attentuation of optical waves on optical transmission paths designed with lightwave guides, said device comprising an optical transmitter, exhibiting a light source and a connection for the path to be measured, and an optical receiver. In order to determine the transmission quality of a transmission path constructed from lightwave guides, the magnitude of the useful signal arriving at the end can be compared with the magnitude of the signal fed into the transmission path, and thus the attenuation of the path can be determined.

From U.S. Pat. No. 4,021,121 a device for measuring interference locations and/or the lengths of glass fibers is known, which comprises an impulse laser and a light-sensitive receiver. The light impulse emitted by the impulse laser penetrates a first focusing optic and subsequently impinges upon a beam divider, for example, upon a partially permeable reflector. The one light share coming from the beam divider is directed towards the glass fiber to be examined with the aid of a second focusing optic; the impulse runs through the glass fiber, is reflected at its end or at an interference location and subsequently reaches the beam divider again in order to strike now the light-sensitive receiver via an additional focusing optic. An additional method for locating a crack on at least one fiber of an optical cable is known from U.S. Pat. No. 4,012,149; this method is based upon a transit time measurement.

Now it is known that the result of attenuation measurements depends upon the mode spectrum excited by means of the irradiating light source. This can be attributed to the fact that not all modes in a lightwave guide propagate with the same efficiency and that therefore light shares, which propagate in unfavorable modes, are lost for the useful output of the communication transmission. In a lightwave guide of the core-jacket type, the main share of the light is propagated in the core. Light, which is conveyed in the core, exhibits various courses. Their wave shapes are called core modes. The light can be axially conveyed in the core material; however, due to the reflection at the border surfaces of the core material it can also propagate in a zig-zag course. Therefrom result various propagation times for the different modes due to the different path lengths. If the light propagating in a zig-zag course includes such a large angle with the border surface of the core that the border angle for total reflection is exceeded, then the light can also reach the jacket area and then proceeds only in the jacket area between the outer and the inner surface of the jacket material due to the reflections at the border surfaces of the jacket area. It thereby deals with jacket modes. Depending upon the course of the light it is also possible that the light is partially conveyed in the core and partially in the jacket of the lightwave guide. These modes are called leakage modes. Since such wave shapes are particularly strongly attenuated, they get lost after a certain course path.

As every lightwave guide practically exhibits some form of irregularities, for example, a not precisely straight course of the lightwave guide, all kinds of modes can be newly formed in the lightwave guide due to mode transformation, which modes subsequently disappear again due to the attenuation typical for them after a certain path length, or said modes are again transformed into different modes. Accordingly, on a lightwave guide path, at least at the beginning, a continuous transition from one wave mode into a different mode and a corresponding attenuation takes place until finally—after a sufficiently long path (approximately 500 to 1000 meters) an end condition of the mode distribution is reached, which is then retained in the further course of the path and which is determining for the attenuation of the transmitted light. Thus, it does matter in what modes the light, which is irradiated for the purpose of measuring in a lightwave guide, is propagated. A measurement with light of such a mode distribution, which does not agree with the mode distribution of the light conveyed in the lightwave guide in a practical operation, would lead to different and therefore to wrong measuring results. This phenomenon is also known from the hollow waveguide technique.

SUMMARY OF THE INVENTION

The underlying objective of the invention is to provide a device facilitating a definite and reproducible measurement on a transmission path.

The objective posed is resolved by the device of the initially described type in that at least two light sources of different wavelengths are provided in the transmitter, which light sources feed their light into a Y-coupler and that a mode mixer and a mode stripper device which strips from the lightwave guide the jacket—and leakage modes which are produced in the mode mixer, are connected at the outlet side of the light sources and/or are connected in series with the optical receiver.

For the utilization of the inventive device, a mode distribution is offered to the lightwave guide to be measured, which corresponds with the condition at the end of a very long fiber. Such a mode condition per se could be produced with the aid of a lens system by means of a corresponding reproduction; however, this technique is less well suited for field measuring apparatus. An additional possibility would result by connecting a sufficiently long lightwave guide in series to the fiber to be measured, whereby the fiber connected in series and the fiber to be measured are advantageously to be designed in identical manner. However, in the inventive device a mode mixer and a mode stripper device are connected before the lightwave guide to be measured, the device stripping the jacket—and leakage modes from the lightwave guide. All core modes and leakage—and jacket modes are excited in the mode mixer. However, in the mode stripper the jacket—and leakage modes are absorbed so that a mode distribution comparable to the end condition ("steady state") remains, which is then conveyed into the lightwave guide to be measured.

A mode mixer, for example, is obtained in that the lightwave guide is subjected to statistically subordinate bendings. In practice, the lightwave guides can be cast inbetween two hammer finished plates. If a lightwave guide fiber is then bent, a light beam, up to then axially propagating in the lightwave guide core, reaches the wall and is there totally reflected and thus transformed into a higher wave mode. It is also possible, on the other hand, that a light in the form of a higher mode after the reflection is by chance transformed into a lower mode or even into a mode axially propagating in a straight line. The total mode spectrum can practically be filled in this manner.

A mode stripper is advantageously obtained in that the lightwave guide in bent form is conveyed through an immersion liquid, whose refractive index corresponds with that of the lightwave guide jacket. Due to the equality of the refractive indices, the light striking the jacket surface is no longer reflected into the jacket area, but rather reaches the immersion liquid surrounding the jacket, and in this manner is practically stripped from the lightwave guide, i.e., it is destroyed. Naturally the same fate awaits the leakage modes as soon as they reach the outer border surface of the jacket.

The advantage of the inventive resolution vis-a-vis other possible resolutions consists in that only a few meters of lightwave guide are required, whereas otherwise at least 500 meters of lightwave guide are needed.

For the measuring of short lightwave guides or lightwave guide lines, into which additionally splices can be built in, the end condition of the mode distribution ("steady state") is not necessarily reached at the decoupling side. For comparable attenuation measurements it is therefore expedient to build in a mode mixer and mode stripper towards the decoupling side in the receiver, also.

It is often desirable to carry out attenuation measurements for various wavelengths with the aid of one single coupling to the path to be measured. In order to obtain this result one could, for example, use white light sources with filters connected at the outlet side. However, the disadvantage of such a device lies in the energy used by the light source, which is again destroyed in the filters. Diodes are therefore advantageously used as light source, which diodes produce light of various wavelengths, for example, 650 nm, 820 nm and 1060 mn.

With the aid of one sample embodiment, illustrated in the Figure on the accompanying sheet of drawings, the invention is explained in the following section; and other objects, features and advantages will be apparent from this detailed disclosure and from the appended claims.

BRIEF DESCRIPTION OF THE DRAWING

The single FIGURE is a diagrammatic view illustrating an exemplary embodiment of the present invention.

DETAILED DESCRIPTION

The field attenuation measuring apparatus comprises a transmitter 1 and a receiver 2, between which the measuring path 3, namely the light conductive fiber to be measured, is located. Three laser—or luminescent diodes 4, 5, 6 are arranged in the transmitter, which diodes produce light of various wavelengths such as those previously given. Respectively two lightwave guides are mounted, for example, affixed, onto the diodes. That lightwave guide 7, 8, 9 which is optimally positioned relative to the diode is used for the measurement, whereas the other lightwave guide 10, 11, 12 fed only by the scatter light or the marginal light of the diode, represents a portion of a regulating circuit which is used for holding the diode luminosity constant.

The lightwave guides 7, 8, 9 used for measuring are combined in Y-coupler 13, 14 which are advantageously welded together. As the attenuation of a Y-coupler lies approximately at 5 dB, care should be taken that that light which is most strongly attenuated, for example, light having a wavelength of 650 nm, passes only through one single Y-coupler. Thus source 6 may supply a wavelength of 650 nm for the case of the wavelengths previously mentioned. A mode mixer and mode stripper 15 is attached to the output of the Y-coupler, for example, with the aid of connectors or by welding. The transmitter connector 16 to which the measuring path 3 is optimally coupled with the aid of a micromanipulator 17, is located at the output of the mode mixer and mode stripper 15. The manipulator facilitates the alignment of the end of the lightwave guide to be measured with all three coordinates.

The decoupling of the light at the end of path 3 again proceeds with the aid of a micromanipulator 17, which facilitates a precise alignment with the receiver input 18. The decoupled light reaches then a mode mixer and mode stripper 15 to which the receiver diode 19 is connected.

It will be apparent that many modifications and variations may be effected without departing from the scope of the novel concepts and teachings of the present invention.

We claim as our invention:

1. A device for measuring the attenuation of optical waves on optical transmission paths designed with lightwave guides, said device comprising an optical transmitter having a connection for the lightwave guide to be measured and an optical receiver for receiving light from the optical transmitter after transmission via such a lightwave guide to be measured, said optical transmitter having at least two light sources of various wavelengths, said light sources having lightwave guides originating therefrom and having optical Y-coupler means for combining the lightwave guides originating from the light sources, and lightwave guide means for transmitting light from said optical Y-coupler means to the connector for transmission via a lightwave guide to be measured such that the light received by a lightwave guide to be measured essentially has the steady state mode distribution which would be present at the end of an optical transmission path of much greater length, said lightwave guide means having mode mixer and mode stripping means which excites multiple modes including said steady state mode distribution and then strips the jacket—and leakage modes from the optical waves transmitted thereby, said mode mixer and mode stripping means being connected between the light sources and the connector and being in the form of a lightwave guiding device.

2. A device according to claim 1, characterized in that a luminescence diode is used as light source onto which two lightwave guides are mounted, of which the one lightwave guide decouples the amount of light required for the measurement, whereas the other lightwave guide is fed by the scatter light or by the marginal light of the diode, and supplies light for the regulation of the diode luminosity.

3. A device according to claim 1, characterized in that at least three lightwave guides originating from the various light sources are combined with the aid of optical Y-couplers.

4. A device according to claim 1, characterized in that the mode mixer and the mode stripper means comprises a longer piece of a lightwave guide which is subjected to statistically subordinate bendings.

5. A device according to claim 1, characterized in that adjustment means for the lightwave guide to be measured is associated with the connection of the transmitter, said adjustment means facilitating an adjustment of a lightwave guide to be measured in three coordinates.

6. A device according to claim 1, with said mode mixer and said mode stripping means being connected at the outlet side of the optical Y-coupler means.

7. A device according to claim 1, with further mode mixer and said mode stripping means being connected in series at the inlet side of the optical receiver.

8. A device according to claim 1, with said optical transmitter and said optical receiver each having a mode mixer and mode stripping means in the form of a lightwave guide device.

* * * * *